Figure 1:
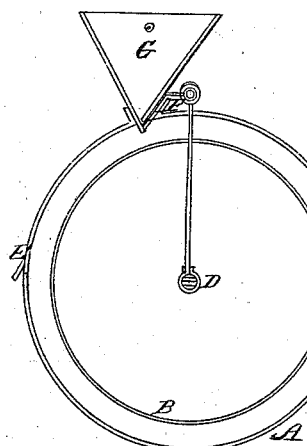

I. WALZ & W. O. STODDARD.
PROCESS OF DESICCATING EGGS.

No. 184,192. Patented Nov. 7, 1876.

Witnesses
Jos. B. Connolly
C. Sullivan

Inventor
Isador Walz
William O. Stoddard
By Connolly Bros.
Attorneys

UNITED STATES PATENT OFFICE.

ISIDOR WALZ AND WILLIAM O. STODDARD, OF NEW YORK, N. Y., ASSIGNORS TO AMERICAN EGG COMPANY, OF SAME PLACE.

IMPROVEMENT IN PROCESSES OF DESICCATING EGGS.

Specification forming part of Letters Patent No. 184,192, dated November 7, 1876; application filed March 4, 1876.

*To all whom it may concern:*

Be it known that we, ISIDOR WALZ and WILLIAM O. STODDARD, of the city of New York, in the county of New York, and State of New York, have invented a certain new and useful Improvement in the Desiccation of Eggs, Albumen or White of Eggs, Yolk of Eggs, Batter of Eggs, and other similar material; and we do hereby declare the following to be a full, clear, and exact description of the invention, such as will enable others skilled in the art to which it pertains to make and use it, reference being had to the accompanying drawings, which form part of this specification.

The object of our invention is to remove by desiccation from the albumen or white of eggs, the yolk of eggs, the batter of eggs, or the yolks and whites of eggs beaten together, or other similar material, the watery or fluid parts and particles thereof with the least possible disturbance or change of the natural or organic structure, conditions, and properties of the remaining parts or particles thereof, and to present the latter in a suitable and convenient form for preservation and subsequent use at a low cost.

We are well aware that that the art of desiccating eggs has already been brought to a highly-advanced state, notably by the inventions and appliances of William O. Stoddard, one of the present petitioners. But we believe that our invention, set forth in this specification, presents marked advantages over any other method of desiccation in rapidity, certainty, cheapness, and uniformity of operation and production, and of the resulting material.

Our invention consisits in the first place in the desiccation of the batter of eggs and other materials above mentioned in large quantities, and commercially, by evaporation of their fluid or watery parts *in vacuo* by inclosing the material while under desiccation in a close vessel or chamber, and partially or wholly removing therefrom the atmospheric air, and with it the moisture, from the material subjected to desiccation, by any of the air-pumps or similar apparatus now in use. The removal of the said fluid or watery parts or particles by this or any other known process while the said material remained without special agitation would tend to leave and present the desiccated residium in a more or less solid state, but ill-adapted to subsequent use and especially to rapid or ready solution in water.

Experience has also shown that any ordinary grinding process tends to diminish the solubility and other valuable properties of such material. In batter of eggs, moreover, when desiccated *in vacuo* without agitation, the heavier parts belonging to the yolk have a tendency to settle to the bottom, and the lighter parts, belonging to the white or albumen, have a tendency to rise to the surface, thus defeating the desired uniform and thorough commingling of the several substances contained in the product and preventing the obtaining of a product commercially valuable and of a standard and uniform character and quality suited to the uses to which the batter of eggs may be applied. In practice, therefore, instead of the desiccation of the batter of eggs or other material in mass we discharge such material for and during the process of desiccation upon a more or less rapidly rotating surface, contained within a closed vessel or chamber, wherein the evaporation *in vacuo* is produced. By this means the required evaporation and desiccation are made to take place almost immediately, and upon a continuous succession of small quantities of the material in layers, and in such manner that when afterward removed by brushing or scraping from the said rotating surface the material falls off in a granular or mealy form and capable of ready and complete solution, and so best adapted to subsequent use.

The rotating surface so to be used for the purposes indicated, and to be contained within such closed vessel or chamber, is obtained in either of the forms indicated in the accompanying drawing of a cylinder or cone, or frustum of a cone, or any equivalent.

Our invention extends to any method by which, with whatever modification or adaptations, the material to be desiccated is subjected to desiccation in a closed vessel or chamber by means of a vacuum or partial vacuum, and with or without rotation or agitation.

Figure 2:
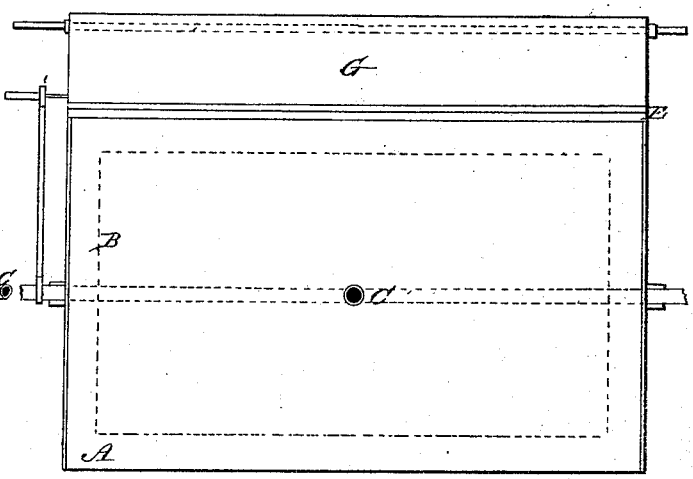
Figure 3:
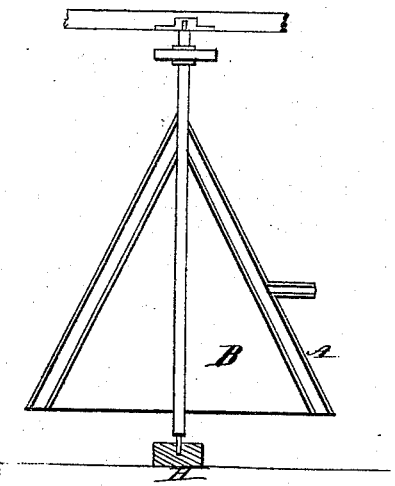
Figure 4:
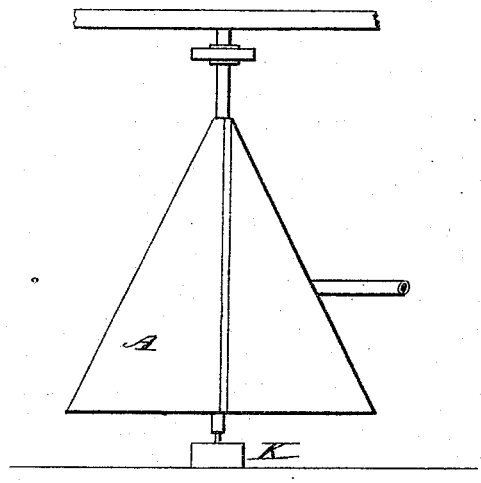
Figure 5:
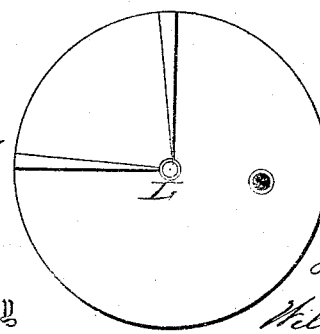

Figures 1 and 2 represent a cylinder, B, composed of suitable material inclosed within a close shell or chamber, as A, for the purpose of receiving upon its outer surface in rotation, for desiccation *in vacuo*, batter of eggs or other material hereinbefore indicated. Said cylinder B revolves upon the shaft or axis D, and the batter of eggs or other material is discharged upon it through a valve or longitudinal opening, as F, in the outer shell of the vacuum-chamber A, from a supplying-reservoir, as G. The vacuum required is produced by a pump working through an aperture in the outer shell or chamber, as C, and the desiccated material is removed through a hermetically-acting door or doors, as E E, in the shell A. Figs. 3 and 4 represent a cone or frustum of a cone, as B, composed of suitable material inclosed within a close shell or chamber, as a, for the purpose of receiving upon its outer surface in rotation, for desiccation *in vacuo*, batter of eggs or other material hereinbefore indicated. Said cone revolves upon the shaft or axis H, and the batter of eggs or other material is discharged upon it from a reservoir, as G, through an opening or valve, as F, in the outer shell of the chamber A. The required vacuum is produced by a pump working through an aperture, C, in the outer shell of the chamber A, and the desiccated material is removed through a hermetically-acting door or doors, as E E, in the shell A, or is made to fall into a reservoir below, as K.

The intense cold produced by evaporation *in vacuo* would tend to injure the quality of the material and product, and diminish or destroy the adaptation thereof to many important uses. It is therefore necessary to maintain the temperature of the rotating surface on which the desiccation is made to take place, and the material thereon, subject to desiccation at a point sufficiently above the freezing-point to prevent all danger of any such destruction or injury. The process of desiccation itself is also promoted by so maintaining the temperature. This is accomplished with either the cylinder, Fig. 1, or the cone, Fig. 3, by injecting steam, or warm air, or water into the inner cavity thereof, and constant renewal of the same as required.

In case the form or method of applying the process of desiccation *in vacuo* be changed from the use of a cone or cylinder to any equivalent thereof, the temperature may be so maintained at a proper degree of heat by a corresponding application of the steam or heated air or water. But at the same time special care must be taken that the temperature of the material subjected to the process be not so raised as to cause change therein or injury thereto—for instance, by elevating the temperature in the case of eggs or batter of eggs, so as to set free the oil of the egg, which is naturally in combination with the more solid parts; and in the case of milk or other analogous substances, so as to cause the same to change and turn sour. We have found by experience that in the case of eggs that result follows if the temperature of the batter of eggs is raised above 85° of Fahrenheit, or thereabout. We have also found that by setting free the oil of the egg, which is in combination with the more solid parts, the character and quality of the product will be changed, and deterioration and decomposition of the product will follow.

The specific mechanical appliances required and involved in this invention are necessarily made the subject of a separate application or applications by William O. Stoddard, one of the present petitioners.

We do not wish to be understood as here claiming as new a product similar to that described and claimed in the patent of Stoddard, September 7, 1875. In said patent the claim was based on a peculiar change in the egg substance, both in the chemical relation of the constituents and in the proportions thereof. While such product differed in many respects from the material previously produced, and was a better article, clearly distinguishable, the product now claimed is also different and essentially new, and is distinguishable not only by chemical analysis but in appreciable quality and appearance.

What we claim as our invention, and desire to secure by Letters Patent, is as follows—

1. In the process of desiccating egg substance by evaporation *in vacuo*, the method herein described for reducing the material to a mealy or granular form without grinding or pulverization, consisting in the agitation or rotation of the material while undergoing such evaporation, substantially as and for the purpose described.

2. In, and as a part of, the process of desiccating by evaporation *in vacuo*, the method of preventing injury to the material from the excessive cold of the vacuum, consisting in the artificial maintenance of a temperature in such material above the normal temperature of the vacuum, substantially as described.

In testimony that we claim the foregoing we have hereunto set our hands this 3d day of February, 1876.

ISIDOR WALZ.
WILLIAM O. STODDARD.

Witnesses:
JOSEPH C. KELSO,
A. W. OLIVER.